United States Patent [19]

Feldstein

[11] Patent Number: 5,514,479

[45] Date of Patent: May 7, 1996

[54] FUNCTIONAL COATINGS COMPRISING LIGHT EMITTING PARTICLES

[76] Inventor: Nathan Feldstein, 63 Hemlock Cir., Princeton, N.J. 08540

[21] Appl. No.: 461,455

[22] Filed: Jun. 5, 1995

[51] Int. Cl.$^6$ .............................. B32B 18/00; C09K 11/00
[52] U.S. Cl. ........................ 428/544; 428/546; 428/553; 427/443.1; 427/8; 427/47; 427/54; 427/98; 427/304; 427/457; 57/401; 205/109
[58] Field of Search .................. 57/401; 428/544, 428/546, 553; 427/443.1, 8, 47, 54, 98; 204/30; 29/132

[56] References Cited

U.S. PATENT DOCUMENTS

| | | | |
|---|---|---|---|
| Re. 33,767 | 12/1991 | Christini et al. | 428/544 |
| 3,930,063 | 12/1975 | Miller et al. | 427/54 |
| 4,282,271 | 8/1981 | Feldstein | 427/98 |
| 4.327,120 | 4/1982 | Siemers et al. | 427/34 |
| 4,358,922 | 11/1982 | Feldstein | 57/401 |
| 4,404,232 | 9/1983 | Evertz | 427/8 |
| 4,716,059 | 12/1987 | Kim | 427/443.1 |
| 4,859,494 | 8/1989 | Lancsek | 427/47 |
| 4,963,441 | 10/1990 | Takai et al. | 428/690 |
| 4,975,160 | 12/1990 | Ostwald et al. | 204/30 |
| 5,023,985 | 6/1991 | Salo | 29/132 |
| 5,145,517 | 9/1992 | Feldstein et al. | 106/1.05 |
| 5,182,138 | 1/1993 | Matsuzawa et al. | 427/157 |

*Primary Examiner*—Donald P. Walsh
*Assistant Examiner*—Daniel Jenkins

[57] ABSTRACT

Disclosed herein is process method and articles of plated coating having functions ranging from wear resistance, lubricity, corrosion resistance, and further incorporating therein particulate matter having light emitting properties. Having this codeposited light emitting particles within the functional layer provides a signal for the determination of the presence of the coating and its stage of deterioration.

18 Claims, No Drawings

FUNCTIONAL COATINGS COMPRISING LIGHT EMITTING PARTICLES

BACKGROUND OF THE INVENTION

The plating of articles with a composite coating bearing finely dispersed divided particulate matter is well documented. This technology has been widely practiced in the field of electroplating as well as electroless plating. The acceptance of such composite coating stems from the recognition that the inclusion of finely divided particulate matter within metallic matrices can significantly alter the properties of the coating with respect to properties such as wear resistance, lubricity, corrosion resistance and appearance.

Electroless composite technology is a more recent development as compared to electrolytic composite technology. The state of the art in composite electroless plating is documented in a recent text entitled "Electroless Plating Fundamentals and Applications," edited by G. Mallory and J. B. Hajdu, Chapter 11, published by American Electroplaters and Surface Finishers Society, Orlando, Fla., (1990).

The evolution of composite electroless plating dates back to Oderkerden U.S. Pat. No. 3,614,183 in which a structure of composite electroless plating with finely divided aluminum oxide was interposed between electrodeposited layers to improve the corrosion resistance. Thereafter, Metzger et al, U.S. Pat. Nos. 3,617,363 and 3,753,667 extended the Oderkerken work to a great variety of particles and miscellaneous electroless plating baths. Thereafter, Christini et al in Reissue Patent 33,767 further extended the composite electroless plating to the codeposition of diamond particles. In addition, Christini et al demonstrated certain advantages associated with the deposition of the barrier layer (strike) prior to the composite layer.

Feldstein in U.S. Pat. Nos. 4,358,922 and 4,358,923 demonstrated the advantages of utilizing a metallic layer above the composite layer. The overlayer is essentially free of any particulate matter. Spencer in U.S. Pat. No. 4,547,407 demonstrated the utilization of a mixture of dual sized particles in achieving improved smoothness of coating, Feldstein et al in U.S. Pat. Nos. 4,997,686; 5,145,517; and 5,300,330 demonstrated the utilization of particulate matter stabilizers in the deposition of uniform stable composite electroless plating and various associated benefits. Parker in U.S. Pat. No. 3,723,078 demonstrated the codeposition of refractory metals and chromium along with composite electroless plating.

Helle et al in U.S. Pat. Nos. 4,098,654 and 4,302,374 have explored special surfactant compositions in the preparation of stabilized PTFE dispersions and their subsequent utilization in electrolytic plating.

Kurosaki et al in U.S. Pat. No. 3,787,294 proposed cationic stabilizers for graphite fluoride be used in electroplating with specific attention focused upon surfactants having a C—F bond in their structure.

Brown et al in U.S. Pat. No. 3,677,907 demonstrated the utilization of surfactants also having a C—F bond in their skeleton used in combination with PTFE electrolytic codeposition.

Henry et al in U.S. Pat. No. 4,830,889, demonstrated the utilization of a cationic fluorocarbon surfactant along with a non-ionic fluorocarbon surfactant for the codeposition of graphite fluoride in electroless plating baths.

Feldstein et al in U.S. Pat. No. 5,389,229, demonstrated the use of "frozen states" to overcome the limited shelf-life associated with certain dispersions before their use in plating applications.

The above patents and applications reflect the state of the art and they are included herein by reference.

In pending application Ser. No. 08/295,563, it has been demonstrated that plated articles can be rejuvenated readily without damage to the base substrate and the parts can be used for repeated cycles. This capability is achieved by the deposition of an Indicator Layer and thereafter the functional layer. As the functional layer is damaged and/or worn the Indicator Layer is exposed alerting the operator to change the parts from it's environmental use. Though this development is most useful, certain limitations are noted.

1. At least two layers are required in the overall metallized structure, i.e., an Indicator Layer and thereafter the functional layer.

2. When rejuvenating the plated articles the remnants of the functional layer and indicators must be removed (stripped) before the new generation can be coated.

Accordingly, though the features for the Indictor Layer are most desirable, greater simplicity is now proposed. Specifically, the current invention incorporates the indicator Layer along with the functional coating (layer) all in one layer. Therefore, in the current invention a continuous signal will be noted from the plated part until the functional layer (including the signaling particles) is worn off. At which time, the signal will cease in the worn region. Upon the cessation of the signal rejuvenation of the part should take place for the repeated usage.

The finely divided particulate matter (indicator particles) referred herein are particles comprised of atoms or molecules that absorb photons of electromagnetic radiation and reemit the absorbed energy by the spontaneous emission of photons which, however, are not the same energy as absorbed photons or the same wavelengths. The phenomenon is generally referred to as luminescence, having light emitting properties.

Luminescence is further classified into fluorescence and phosphorescence. If the emitted radiation continues for a noticeable time (generally between $10^{-4}$–$10^{-9}$ seconds) after the incident radiation is removed, the process is referred to as fluorescence. Specific examples of such materials include pore solids of known chemical composition or naturally occurring metals.

It is apparent from the above that a wide variety of materials can usefully be employed as the Indicator particles.

SUMMARY OF THE INVENTION

It is the objective of the present invention to improve the performance and longevity of plated articles, particularly for repeated uses and thereby preserving resources of materials and costs, and at the same time, preserving the quality of the product manufactured from the plated articles. This and other objectives of the present invention together with advantages over existing prior art and method will become apparent from the following specification and the method described herein.

DESCRIPTION OF THE PREFERRED EMBODIMENT

According to the concept of t he present invention, the formation of functional plated articles bearing light emitting particles are described. The presence of the light emitting particles (indicator components) dispersed within the functional layer provide a method for the detection of the coating while it is in use. Upon the disappearance of such signal, it is time to rejuvenate the entire plated article or its removal from use. The functional layer may serve any of several functions ranging from wear resistance, corrosion resistance, and lubricity. The functional layer may be any of several coatings of pure metal(s) and alloys or composite plated articles which include dispersed particles. The functional layer may provide lubricity, wear-resistance, corrosion resistance and others. The inclusion of particles for enhancement of properties is also well documented in the prior art from particles such as diamond, carbides, PTFE, ceramic, etc.

As is noted from the following example and teaching, a significant visual signal is noted despite the fact that the light emitting particles are few in concentration within the codeposited functional layer. The following example is an illustration whereby a functional layer intended for a wear resistance application comprises silicon carbide codeposition is tailored to the present invention by the codeposition of light emitting particles. It should be noted that the present invention is not limited to the type of plating bath used, i.e., electrolytic vs. electroless. Plating may be executed via electroless or electrolytic deposition of various metals and alloys.

The bath used was NiPLATE 300. This berth provides a low phosphorous alloy of nickel via electroless plating. The bath is manufactured and sold by Surface Technology, Inc., Trenton, N.J.

Total bath volume=3,500 ml pH=6.3±0.2

Temperature=82° C.±2° C.

Particles used per 3,500 ml bath:
    8.1 gms $CaWO_4$* (Cerac Speciality Inorganics, 325 mesh)
    4.2 gms SiC (1,200 mesh, green)

$$CaWO_4 = \frac{8.1}{12.3} + 65.8\% \text{ by weight}$$

SiC=100–65.8=34.1% by weight

The $CaWO_4$ is activated powder which emits a blue light upon exposure to UV light. The plated article from the above composition when exposed to a UV light (about 254 mm) resulted in the emission of a blue colored light reflecting upon the codeposition of the indicator particles along with the wear-resistant SiC particles. A cross sectional cut verified the presence of both particles.

What is claimed is:

1. A plated article comprising a substrate, a metallic functional coating and finely divided particulate matter dispersed therein said particulate matter having light emitting properties and further said plated article is produced by a plating method.

2. The article according to claim 1 wherein said functional layer provides lubricating properties.

3. The article according to claim 1 wherein said functional layer provides wear resistant properties.

4. The article according to claim 1 wherein said functional layer provides corrosion resistant properties.

5. A process for the manufacturing of a plated substrate comprising; contacting said substrate with a plating composition to deposit a functional layer and further wherein said plating composition further comprises finely divided indicator particles dispersed therein to yield a functional layer with said indicator particles dispersed therein.

6. The article according to claim 1 wherein the disappearance of said functional coating further results in the cessation of light emitting properties associated with said particulate matter.

7. The article according to claim 1 wherein said functional coating further comprises other finely divided particulate matter to enhance the properties of said functional coating.

8. The article according to claim 7 wherein said other divided particulate matter are selected to provide properties ranging from lubricity, wear resistance, and corrosion resistance.

9. The article according to claim 1 wherein said plating method is an electrolytic method of deposition.

10. The article according to claim 1 wherein said plating method is an electroless method of deposition.

11. The process according to claim 5 wherein said plated substrate is deposited by an electrolytic method of deposition.

12. The process according to claim 5 wherein said plated substrate is deposited by an electroless method of deposition.

13. The process according to claim 5 wherein said plating composition further comprises a particulate matter stabilizer.

14. The process according to claim 13 wherein said particulate matter stabilizer is an anionic chemical.

15. The process according to claim 13 wherein said particulate matter stabilizer is a nonionic chemical.

16. The process according to claim 13 wherein said particulate matter is a cationic chemical.

17. The process according to claim 5 wherein said plating composition further comprises secondary finely divided particles codeposited within the functional layer.

18. The article according to claim 1 wherein said metallic functional coating further comprises secondary finely divided particles codeposited within said functional coating.

* * * * *